US008224766B2

(12) United States Patent
Skibiski et al.

(10) Patent No.: US 8,224,766 B2
(45) Date of Patent: Jul. 17, 2012

(54) COMPARING SPATIAL-TEMPORAL TRAILS IN LOCATION ANALYTICS

(75) Inventors: Greg Skibiski, New York, NY (US); Alex (Sandy) Pentland, Lexington, MA (US); Tony Jebara, New York, NY (US); Christine Lemke, New York, NY (US); Markus Loecher, Princeton Junction, NJ (US); Girish Rao, New York, NY (US); Jason Uechi, Montclair, NJ (US); Blake Shaw, New York, NY (US); Joseph Mattiello, New York, NY (US); David Rosenberg, Scotch Plains, NJ (US)

(73) Assignee: Sense Networks, Inc., New York, NY (US)

(*) Notice: Subject to any disclaimer, the term of this patent is extended or adjusted under 35 U.S.C. 154(b) by 805 days.

(21) Appl. No.: 12/241,227

(22) Filed: Sep. 30, 2008

(65) Prior Publication Data

US 2010/0079336 A1 Apr. 1, 2010

(51) Int. Cl.
  *G06F 17/00* (2006.01)
  *G06N 7/00* (2006.01)
(52) U.S. Cl. ........................................................ 706/55
(58) Field of Classification Search .................. 706/55
  See application file for complete search history.

(56) References Cited

U.S. PATENT DOCUMENTS

| | | | |
|---|---|---|---|
| 6,038,559 A | 3/2000 | Ashby et al. | |
| 6,408,278 B1 | 6/2002 | Carney et al. | |
| 6,704,787 B1 | 3/2004 | Umbreit | |
| 7,107,285 B2 * | 9/2006 | von Kaenel et al. | 1/1 |
| 7,292,963 B2 | 11/2007 | Bornhoevd et al. | |
| 2001/0029506 A1 | 10/2001 | Lee et al. | |
| 2001/0036224 A1 | 11/2001 | Demello et al. | |
| 2001/0049636 A1 | 12/2001 | Hudda et al. | |
| 2002/0111852 A1 | 8/2002 | Levine | |
| 2004/0117358 A1 * | 6/2004 | von Kaenel et al. | 707/3 |
| 2005/0143909 A1 | 6/2005 | Orwant | |
| 2006/0074883 A1 | 4/2006 | Teevan et al. | |
| 2006/0085177 A1 | 4/2006 | Toyama | |
| 2006/0223505 A1 | 10/2006 | Starr et al. | |
| 2008/0005674 A1 | 1/2008 | Wattenberg et al. | |
| 2008/0082472 A1 | 4/2008 | Dalton | |
| 2008/0188261 A1 | 8/2008 | Arnone | |

OTHER PUBLICATIONS

Donoho, David, et al., "Higher Criticism for Detecting Sparse Heterogeneous Mixtures," *The Annals of Statistics*, 32(3):962-994 (2004).
Kulldorff, Martin, "A Spatial Scan Statistic," *Communications in Statistics—Theory and Methods*, 26(6): 1481-1496 (1997).

(Continued)

*Primary Examiner* — Michael B Holmes
(74) *Attorney, Agent, or Firm* — Kaplan Breyer Schwarz & Ottesen, LLP

(57) ABSTRACT

Systems and computer-implemented methods are provided for comparing, associating and deriving associations between two or more spatial temporal data trails. One or more spatial-temporal data trails comprising one or more places are received at a processor. Each place is identified by a spatial temporal data point. And each spatial-temporal data trail is associated with an individual. The similarity between pairs of places is determined to establish one or more groups of places or one or more groups of individuals. Similarity and/or groups can be determined based on demographics associated with the place or individual.

49 Claims, 13 Drawing Sheets

OTHER PUBLICATIONS

Kulldorff, Martin, "Prospective time-periodic geographical disease surveillance using a scan statistic," *Journal of the Royal Statistical Society*, A164:61-72 (2001).

Kulldorff, Martin, "Spatial Disease Clusters: Detection and Inference," *Statistics in Medicine* 4:799-810 (1995).

Loh, Ji Meng, et al., "Accounting for Spatial Correlation in the Scan Statistic," manuscript, also published in *Annals of Applied. Statistics* 1(2): 560-584 (2007).

Neill, Daniel B., "Detection of Spatial and Spatio-Temporal Clusters," (Ph.D. thesis, Carnegie Mellon University) (2006).

Rogerson, Peter A., "Monitoring Point Patterns for the Development of Space-Time Clusters," *Journal of the Royal Statistical Society. Series A (Statistics in Society)*, 164(1):87-96 (2001).

International Search Report mailed in PCT/US2009/058782 on Apr. 26, 2010.

International Search Report mailed in PCT/US2009/058768 on May 17, 2010.

Neill, Daniel B., et al., "Anomalous Spatial Cluster Detection," Proceedings of the KDD 2005 Workshop on Data Mining Methods for Anomaly Detection.

Non-Final Office Action mailed on Sep. 27, 2010 in co-pending U.S. Appl. No. 12/134,634.

Channavajjala, Srirama T., "U.S. Appl. No. 12/134,634 Office Action May 24, 2011", , Publisher: USPTO, Published in: US.

* cited by examiner

COMPARING SPATIAL-TEMPORAL TRAILS IN LOCATION ANALYTICS

TECHNICAL FIELD

The present invention generally relates to systems and methods for performing sensor analytics. More specifically, the present invention relates to systems and methods for comparing associating and modeling time/location data points.

BACKGROUND

The proliferation of GPS and other positioning methods in mobile phones, taxis, personal navigation devices and automobiles has resulted in an enormous amount of historic and real-time data, consisting of a latitude, longitude, time stamp, unique identifier, and associated metadata.

For example, location-based media (LBM) delivers multimedia directly to the user of a mobile device dependent upon their location. The media can be delivered to, or triggered within any portable wireless device that is location enabled and has the capacity to display audiovisual content. Media content is managed and organized externally of the device on a standard desktop or laptop. The mobile device can download formatted content with location coordinated triggers applied to each media sequence. As the location-aware device enters the selected area, the assigned media is triggered. The assigned media is designed to be of optimal relevance to the user in the context of the user's surroundings.

In addition to location based media, there are other back-end server systems that process sensor data in real-time, including GPS, Wifi, and other location data, for example, a taxi dispatch system, the air traffic control system, or RFID systems for tracking supply chains. All of these systems were built for a specific purpose, a specific kind of sensor, and provide limited and focused analysis relevant to the specialized system. Moreover, historical information and related geographic information is typically limited to the current time and place of the subject of interest.

There has not been a system employing methodologies to associate data based on the historical location record of an individual device or user and demographic data that may be associated with the locations in the historical location record of an individual user. Current location-based services do not allow for the detection of similarities between individuals or users based on location history, or location based demographic affiliations.

SUMMARY

The present invention generally relates to systems and methods for performing sensor analytics. More specifically, the present invention relates to systems and methods for associating spatial-temporal data-points, for example associating demographic characteristics with various geographic or time based coordinates, such as a GPS trail or other spatial-temporal data flow. The present invention also relates to systems and methods for grouping time-location data trails and/or individuals associated with time-location data trails.

In an exemplary implementation, a spatial-temporal data flow (e.g., a GPS trail, an RFID enabled product trail, a cellular telephone log, and the like) is analyzed to determine the time and or place a particular individual, either person or device, is or was located. The time and geographic coordinates can be associated with pre-identified demographic information. The geographic or time coordinates can be replaced with semantic coordinates representing one or more demographic characteristics. In this manner a semantic or demographic trail can be established for the individual. From the semantic or demographic trail certain qualities and attributes pertaining to the individual can be derived. In an implementation, comparison of the semantic or demographic trail to historical data or other semantic trails can provide likely group affiliations of the individual, as well as other demographic characteristics attributable to the individual based on when and where the individual has traveled.

By way of illustration, and without limitation, in one implementation a cellular telephone that is frequently in the warehouse district of city "Metropolis" during normal business hours can be associated with the transportation or logistics business sector. Similarly, a cellular telephone that is frequently in the warehouse district of city "Metropolis" during the late night and early morning hours can be associated with the late night entertainment industry.

Further demographic associations can be made as they related to the cellular telephone, and by extension, the user. The cellular telephone that is in the warehouse district during business hours may also be found in suburban retail locations during the early evening hours and in a middle-class suburban neighborhood during the late night and early morning hours. Based on the historical time and location data (i.e., spatial-temporal data) of the particular cellular telephone and the census or other demographic data associated with each time and location data point, the user of the first cellular telephone can be assigned an individual demographic profile. In the present example the user of the first cellular telephone can generally be associated with groups identifying with middle-class working people leading a largely suburban lifestyle.

At the same time, further association can also be made about the second cellular telephone that is in the warehouse district during the late night and early morning hours. Continuing with the example, the second cellular telephone may also be found in and around a university campus during business hours and frequently located in a lower rent neighborhood having a high percentage of students during overnight hours. From the demographic data associated with the spatial-temporal data of the second cellular telephone's time, the user of the second telephone can generally be associated with groups identifying with socially active college or graduate students.

In both the case of the first cellular telephone and the second cellular telephone meaningful demographic information in the form of an individual profile can be derived by linking or associating various demographic or other information with the times and places that the cellular telephone travels. The individual profile can be determined without the benefit of a prior registered user profile, or without soliciting profiling information such as user or consumer preferences. And the individual profile can be determined without introducing user bias, such as the user choosing which demographic, consumer or user groups he or she would prefer to be associated with.

In an implementation a computer implemented method for determining similarities in one or more spatial-temporal trails is provided. The method includes the steps of: receiving spatial-temporal flow data associated with one or more individuals; assigning semantic coordinates to the flow data to create a first semantic trail; and determining the similarity of the first semantic trail with a second semantic trail.

In another implementation a computer implemented method of conveying aggregate location-based information is provided. The method includes the steps of: receiving one or more location-based data flows associated with a first individual, wherein the location-based data flows comprise one or more spatial-temporal waypoints; associating one or more demographics profiles with the spatial-temporal waypoints; assigning a demographic-based data flow to the first individual; and comparing the demographic-based data flow of the first individual to a second demographic-based data flow of a second individual.

In a further implementation, a computer implemented method is provided including the steps of receiving one or more spatial-temporal data trails. The data trail includes one or more places. Each place is identified by a spatial-temporal data point. Each spatial-temporal data trail is associated with an individual. The method further includes the step of determining similarity between pairs of places to establish one or more groups of places or one or more groups of individuals. The method further includes the step of determining similarity between pairs of individuals to establish one or more groups of individuals.

In yet another implementation, a computer readable medium is provided having a stored computer program that, when executed, causes a computer to perform the steps of: receiving one or more spatial-temporal data trails comprising one or more places, wherein each place is identified by a spatial temporal data point and wherein each spatial-temporal data trail is associated with an individual; assigning semantic coordinates to the spatial-temporal data points resulting in a semantic data point, and determining similarity between pairs of places to establish one or more groups of places or one or more groups of individuals. The method further includes the step of determining similarity between pairs of individuals to establish one or more groups of individuals.

In still a further implementation, a system for determining similarity between spatial-temporal trails is provided. The system include a network; one or more user devices in communication with the network; and a processor in communication with the network. The processor receives one or more spatial-temporal data trails. The data trails include one or more places, wherein each place is identified by a spatial-temporal data point and wherein each spatial-temporal data trail is associated with an individual. The processor further assigns semantic coordinates to the spatial-temporal data points resulting in a semantic data point. The processor further determines the similarity between pairs of places to establish one or more groups of places or one or more groups of individuals. The processor further determines the similarity between pairs of individuals from their corresponding spatial-temporal data to establish one or more groups of individuals.

In an implementation, a system is provided comprising: a means for receiving one or more spatial-temporal data trails comprising one or more places, wherein each place is identified by a spatial temporal data point and wherein each spatial-temporal data trail is associated with an individual; a means for assigning semantic coordinates to the spatial-temporal data points resulting in a semantic data point; and a means for determining the similarity between pairs of places or individuals to establish one or more groups of places or one or more groups of individuals.

In various implementations of the present invention, the spatial-temporal flow data can include one or more of the following features:
   i. geographic coordinates associated with one or more individuals,
   ii. grid coordinates associated with one or more individuals,
   iii. GPS coordinates associated with one or more individuals,
   iv. time increments associated with one or more individuals, and
   v. data indicating the time and place of one or more individuals' locations.

Various implementations of the present invention can include one or more the following additional features:
   i. The individual includes a person, a GPS enabled device, a location enabled device, an RFID enabled device, a cellular telephone, a personal data assistant, a networked computer, a communication device, or a vehicle.
   ii. The individual is anonymously identified by use of a GPS enabled device, a location enabled device, an RFID enabled device, a cellular telephone, a personal data assistant, a networked computer, a communication device, or a vehicle.
   iii. One or more individuals' locations includes past locations.
   iv. The spatial-temporal flow data is received in real time.
   v. The spatial-temporal flow data comprises historical data.
   vi. Semantic coordinate values identify a demographic characteristic.
   vii. Demographic characteristics include Census Bureau data, financial demographics, social demographics, marketing data, group demographics, organizational affiliation, social affiliation, sales data, historical demographical information, derived demographic information, gender, race, age, religion, ethnic affiliation, sexual preference, marital status, dependent status, educational level, historical geographic information, or user entered information/preferences.

Various implementations of the present invention can include one or more the following additional features:
   i. The semantic trail is a historical semantic trail.
   ii. First and second semantic trails are associated with the same individual.
   iii. First and second semantic trails are associated with different individuals.
   iv. The data flow is received in real time.
   v. The data flow comprises historical data.
   vi. The spatial-temporal waypoint includes a latitude-longitude coordinate, a grid coordinate, a GPS coordinate, an address, a network cell, a time period, or a specific time.
   vii. A demographic profile is assigned to each spatial-temporal waypoint in a dataflow.
   viii. Comparing demographic-based data flows comprises comparing similarity matrices of all demographic-based data flows for one or more individuals.

Various implementations of the present invention can include one or more the following additional features:
   i. Determining the similarity comprises assigning semantic coordinates to the spatial-temporal data points resulting in a semantic data point.
   ii. Determining the similarity comprises associating demographic information with the spatial-temporal data point or the semantic data point.
   iii. Determining the similarity comprises associating an industrial code with the spatial-temporal data point or the semantic data point.
   iv. Determining the similarity further comprises associating an in-flow and out-flow data with the spatial-temporal data point or the semantic data point.
   v. Determining the similarity further comprises determining the probability of movement of the individual in semantic space.
   vi. Established groups of individuals and associated data are exported for further processing, display or storage.

DETAILED DESCRIPTION

Figure 1:
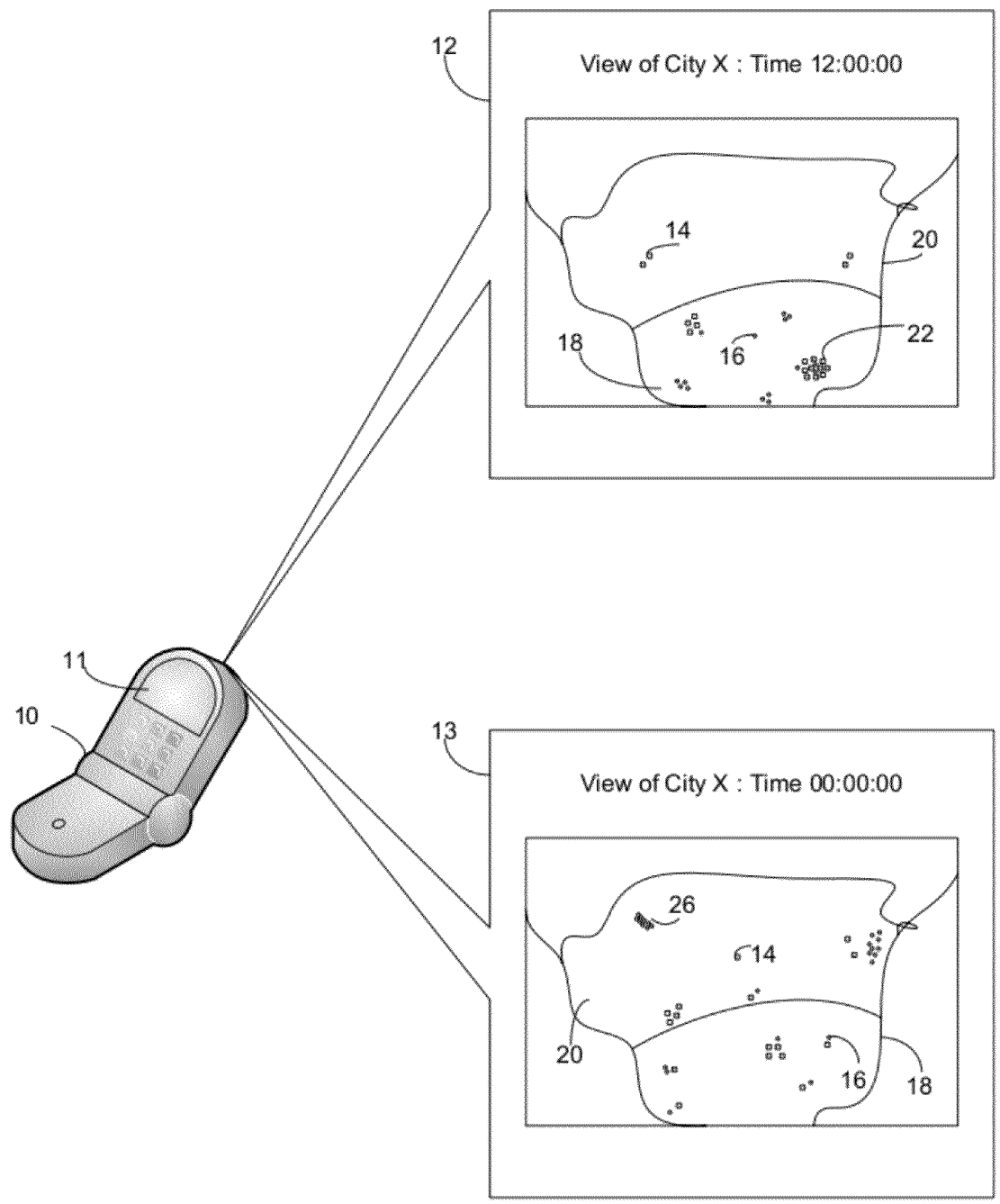
FIG. 1 shows a series of screen shots depicting the location of associated data in accordance with an implementation of the present invention.

For purposes herein, a "group" or "semantic group" is any association of an individual with other individuals that share a common demographic profile, other common association, or share one or more semantic or demographic coordinates in a semantic or demographic trail. Groups can include individuals that are in a particular place at a particular time or individuals that frequent a particular place during a particular occurrence. For example, and without limitation, a semantic group can include:

i. all individuals that visit a shopping mall on Saturday afternoon, or ii. all individuals that visit a shopping mall during a sale or discount event.

A semantic group can include an association of individuals, by age, gender, race, religion, national or regional origin, sexual orientation, organizational membership or participation, educational level, income level, tax bracket, profession, vocation, occupation, consumer demographical information, political affiliation or leaning, hobby, interest, activity, geographic location, neighborhood, town, borough, city, county, state, preferred consumer/retail/wholesale provider, event, occurrence, participation in an event or occurrence, time or time period, or any other shared experience in type, time or location between two or more individuals.

For the purposes herein, an "individual" is any information that identifies a unique or distinct person, device, object, event or place at a particular time, occurrence or location. An individual can be a location enable device, such as a cellular telephone, a GPS enabled device, a networked device, a WiFi enabled device, an RFID enabled device, an ATM machine, or any other device that identifies a spatial-temporal data point. An individual can be a user of any of the aforementioned devices. An individual can also include a place or event that identifies a spatial-temporal data point associated with that place or event.

For the purposes herein, a "spatial-temporal data point, coordinate or waypoint" is data or other information that identifies a specific event, user, or device at a specific time and/or location. For example, and without limitation, a spatial-temporal data point can include:

i. a time stamp associated with a geographic location, such as, the time at a latitude and longitude;

ii. a time stamp associated with a specific event at a fixed geographic location, such as, the time of a special or sale at a store or entertainment venue; or iii. the occurrence of an event at a particular time and location, such as, a full taxi cab in the warehouse district at 2:00 am.

A place, time, event, occurrence, device, or user can be identified by a spatial-temporal coordinate.

In an implementation, one or more individuals associated with one or more semantic groups can be displayed on a map or grid. The display can be in real time. The display can be delayed from real time by a time differential. The display can be refreshed according to a predetermined schedule.

In an implementation, the population density of individuals associated with a group in any given location can be displayed. In an implementation, places and events of interest to a group can be displayed. In an implementation, targeted information can be displayed with the geographic location and population density of a group.

In an implementation, group membership or affiliation of an individual can be determined based on historical location and time data, such as spatial-temporal flow data. In an implementation group membership can be determined based on demographic information associated with the spatial-temporal data point associated with the spatial-temporal flow data. In an implementation demographic profiles of one or more individuals can be derived from spatial-temporal data points, demographic information associated with spatial-temporal data points, historical data associated and unassociated with spatial-temporal data points, or historical data and demographic data associated and unassociated with an individual.

For the purposes herein, "demographics, demographic information and demographic data means any information, historical or derived, which describes or categorizes a particular place, location, event, occurrence, time or period of time, individual, user, device or object, and the like. Demographic information and demographic data can include, without limitation: Census Bureau data, age, gender, religion, ethnicity, national or regional origin, education level, income level, employment, occupation, vocation, career, hobby, interest, marital status, sexual orientation, consumer preferences, consumer habits, organizational membership and participation, occurrence of an event, geographic location, time or time period, group membership and/or group association. Demographic information can include user input data or preferences.

In an exemplary implementation depicted in FIG. 1, mobile device 10 includes a user interface having a display 11 on which one or more groups can be displayed at various geographic locations, such as locations on a city map, at a particular point in time. In view 12 groups 14 and 16 are displayed at various locations around City X, including neighborhood 18 and neighborhood 20, at time 12:00:00. In view 13 groups 14 and 16 are displayed at various locations around City X, including neighborhood 18 and neighborhood 20 at time 00:00:00. Groups can be identified on the display 11 by group indicators 14 and 16. Group indicators 14 and 16 can be of any unique icon, shape or color that distinguishes one group from another.

In the exemplary implementation of FIG. 1, group 14 clusters around location 22 in neighborhood 18 at time 12:00:00. Group 14 is also fairly dispersed between neighborhoods 18 and 20 at time 00:00:00. Also, group 16 is fairly dispersed between neighborhoods 18 and 20 at time 12:00:00 and concentrated at location 26 in neighborhood 20 at time 00:00:00.

As described further below, associating demographic information about neighborhoods 18 and 20, as well as locations 22 and 26 can provide meaningful information leading to an individual profile for members of groups 14 and 16.

Figure 2:
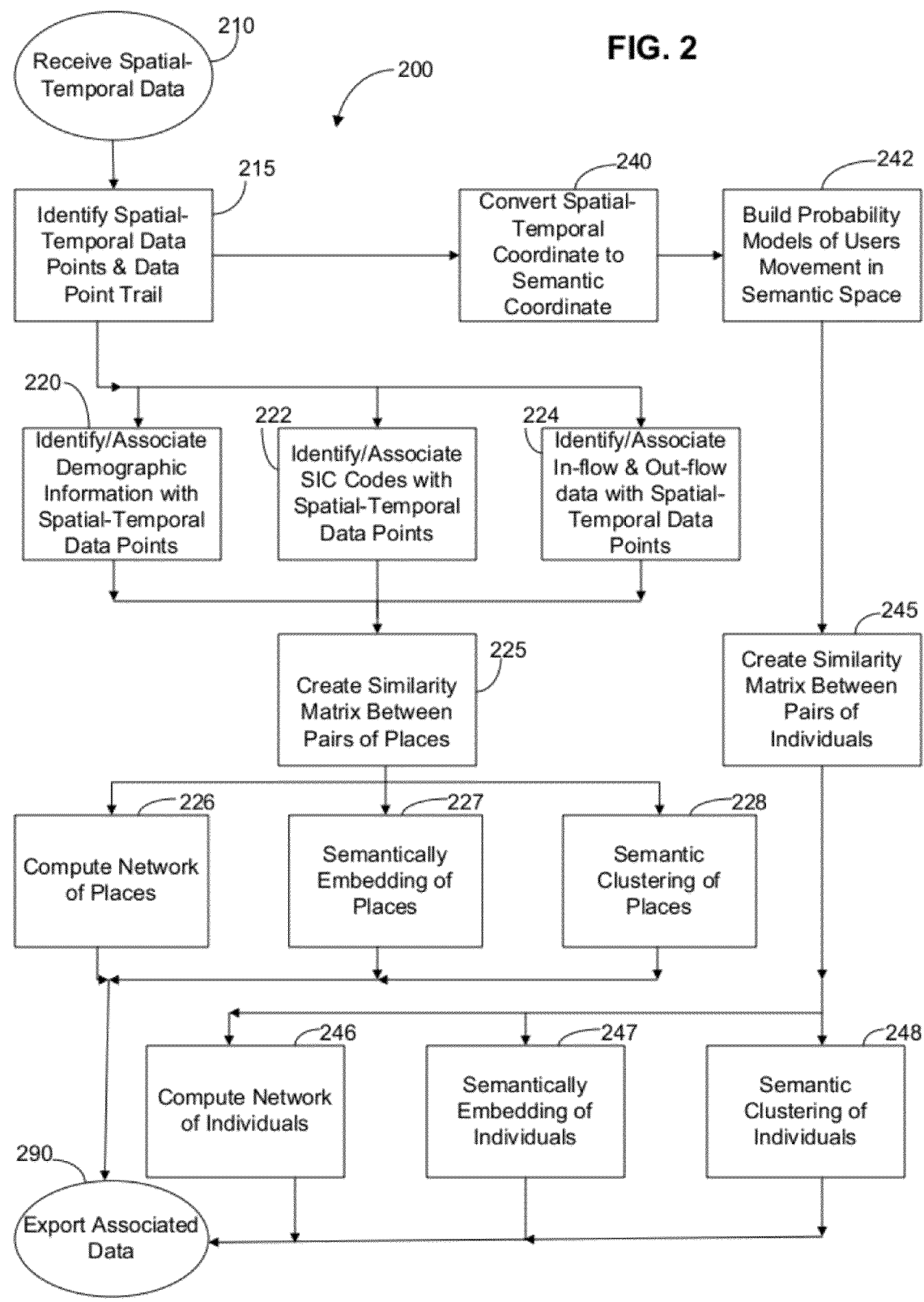
FIG. 2 shows a flow chart of an implementation of the present invention.

FIG. 2 depicts an exemplary implementation of a method 200 for determining similarities in spatial-temporal flow data. Method 200 can identify similarities between places, people, time and/or trails of people or places over time. Additional characteristics and associations can be made after determining such similarities, including grouping of like attributes, assigning event probabilities, and the like. Method 200 includes: receiving spatial-temporal flow data 210; identifying one or more time and location data points within a spatial-temporal trail 215; identifying or associating demographic information with each time and/or place in a spatial-temporal trail 220; identifying or associating Standard Industrial Codes ("SIC") with each time and/or place in a spatial temporal trail 222; identifying or analyzing in-flow and out-flow data for each time and/or place in a spatial-temporal trail 224; creating a similarity matrix between one or more pairs of places 225; determining a network of places 226; performing semantic embedding of places 227; performing semantic clustering of places 228 and exporting data associated and/or derived with such places 290.

Method 200 further includes receiving spatial-temporal flow data 210; identifying one or more time and location data points within a spatial-temporal trail 215; converting time and location data points to semantic coordinates 240; building probability models of individual movement in semantic space 242; creating a similarity matrix between one or more pairs of individuals 245; determining a network of individuals 246; performing semantic embedding of individuals 247; performing semantic clustering of individuals 248 and exporting data associated and/or derived from individuals 290.

Figure 3:
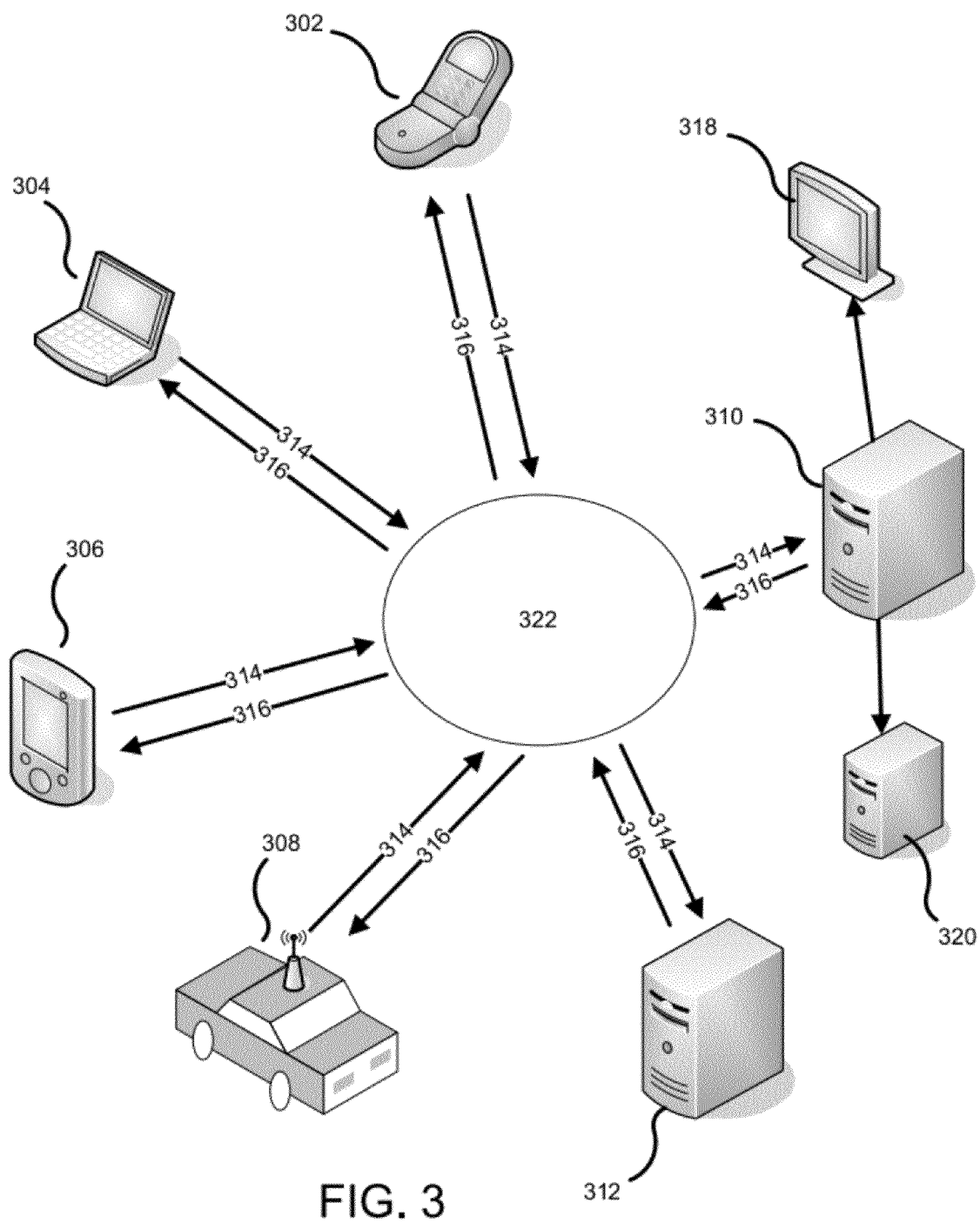
FIG. 3 shows a system diagram of an implementation of the present invention.

FIG. 3 depicts an exemplary system 300 for performing the various methods of the present system. System 300 includes one or more user devices connected to a network 322 for sending data to (via element 314) or receiving data from (via element 316) an application server 310. The user devices include, but are not limited to, electronic devices such as:
  i. a cell phone 302,
  ii. a computer 304,
  iii. a personal digital assistant 306, or
  iv. a global positioning system (GPS) enabled device 308.
In some cases, the user devices also can include a database server 312. The user devices may include one or more program applications that are designed to interact with the application server 310.

In operation, the application server 310 receives, via the network 322, spatial and/or temporal data from one or more of the user devices. The application server 310 analyzes the received data and determines similarities and other derived demographic or comparative associations between data sets associated with various user devices or individuals, such as a device user. The server 310 can send the results of the analysis to the user devices for display, store the results in a data repository 320, or export the results to a display 318 separate from the user devices. The data repository 320 may be located in a component separate from the application server 310 or may be part of the application server memory.

Referring to the exemplary implementation of FIG. 2, spatial-temporal data can be received at step 210 by a network server over a network. The spatial temporal data can be received in real time or in batches of stored or historical data. Spatial-temporal data can be received in time-location trails, such as GPS data trails, mobile telephone cell and micro-cell trails, geographic grid coordinate trails, computer network trails, or any other data trail that identifies the time and/or place a particular device is located at, used, accessed or otherwise identified within a spatial-temporal grid or network. Spatial temporal data can be received from an individual device, a service or network provider or a data aggregator. Spatial-temporal data can be received as one or more time-location trails, each trail associated with one or more individuals, devices, or users.

Upon receipt of the spatial-temporal data, unique spatial-temporal or time-location data trails are identified at step 215. Each time-location data trail can include one or more discrete data points identifying the time and/or location that the individual or device was located, activated or performed, participated in or experienced an event or occurrence. A spatial-temporal data point is data or other information that identifies a specific event, user, or device at a specific time and/or location. This can include GPS data from a specific GPS enabled device, such as a GPS enabled cellular telephone, navigational device, laptop computer, and the like. This can also include the location of a cellular telephone within the cellular network, i.e., the location of the particular cellular telephone within a particular cell at a particular time. This can also include passive location based services such as ATM machines, which give the time and location of a unique user. This can also include RFID enabled devices. This can also include the location of a computer within a WiFi network. The examples provided herein are exemplary and not intended to be limiting. The individualized spatial-temporal data point is unique to the source of the data, for example, and without limitation, unique to the cellular telephone, ATM debit card, or EZPass® RFID transmitter.

A time-location data trail is a trail of one or more time-location data points. For example a GPS data trail can show the time and location of a GPS enabled device over the course of a 24 hour period. Other examples include the use of a mobile or cellular telephone with in a cellular network, access of ATM's throughout a financial network, use of a computer in a wireless network, the time and location of a product throughout a supply chain, the time and location of a package throughout a shipping system, the time location of an item, such as a shipping container, through a logistics system; and the time and location of a vehicle through toll facilities. Other data points can include the time and/or location of an event or occurrence within a population, such as the occurrence of an accident, illness or crime. Examples given herein are exemplary and not intended to be limiting.

Time location data points can be associated with an individual or specific device to represent a unique spatial-temporal data trail. Analysis and comparison of the data points between two trails can provide demographic information about the data points in each trail. Analysis and comparison of the individuals associated with different data points can provide demographic information about such individuals.

Having identified individual data points within a spatial-temporal trail at step 215, demographic information and categories can be associated with each data point at step 220. Demographic information can be any information, historical or derived, which describes or categorizes the data point. Demographic information and demographic data can include, without limitation: Census Bureau data, age, gender, religion, ethnicity, national or regional origin, education level, income level, employment, occupation, vocation, career, hobby, interest, marital status, sexual orientation, consumer preferences, consumer habits, organizational membership and participation, occurrence of an event, geographic location, time or time period, group membership and/or group association.

In addition to associating demographic information at step 220 with each time-location data point in an individual data trail, SIC codes can also be associated at step 222 with each data point in the spatial-temporal data trail. The Standard Industrial Classification (abbreviated SIC) is a United States government system for classifying industries by a four-digit code. Other industrial classification codes can be used, for example the North American Industrial Classification Code.

In-flow and out-flow data can also be identified at step 224 and associated with each data point. In-flow data comprises the data point or points immediately preceding the data point being analyzed. For example the location at which an individual or device was located prior to arrival at the current data point. Out-flow data comprises the data-point or points immediately following the data point being analyzed. For example, the location at which an individual or device went to after stopping at the data point being analyzed. It will be appreciated that in-flow and out-flow data can be replaced for a Markov transition matrix.

Additional categorization techniques can be used to uniquely identify the data points in a time location data trail.

A similarity matrix can be computed at step 225 using a comparison of demographics between the data points in two or more time-location data trails. A similarity matrix can also be computed at step 225 comparing the SIC codes of the data points in two or more time-location trails. A similarity matrix can be computed at step 225 comparing the in-flow and out-flow data of the data points in two or more time-location data points. A similarity matrix can be computed using comparisons of any combination of categorization techniques for uniquely identifying the data points in a time-location data trail. A similarity matrix is a matrix of scores which express the similarity between two data points.

Using a similarity matrix of the aforementioned categorization techniques, various derived analyses can be performed using standard matrix tools, such as computing a network of places at step 226, performing semantic embedding of places at step 227 and performing semantic clustering of places at step 228. Such derived analyses can be performed to identify and characterize qualitatively and quantitatively similar data points between two time location data trails, similar trail segments or multiple data points within two trails, or complete time location data trails. It will be appreciated that a kernel matrix can be replaced for the similarity matrix. It will be appreciated that known distance, metric and kernel functions can be used to derive analyses from matrices formed by various time location data points and trails, including forming a network of data points, semantic embedding (using eigenvectors, Perron vectors, Locally Linear Embedding ("LLE") or Minimum Volume Embedding ("MVE") for example) and semantic clustering (using spectral clustering algorithms, for example).

Similarity data between two or more time location data trails or data points within two or more time location data trails can be exported at step 290 for further analyses, display to a user, or stored in a data base for future use.

Method 200 also facilitates comparison of individuals associated with various time-location data trails. Having received the spatial-temporal data at step 210 and identified time-location data trails defined by one or more time-location data points at step 215, the time-location coordinates of each data point can be converted to semantic coordinates and semantic clusters at step 240. A probability model is then calculated at step 242 based on an individual's movement through semantic space. For example, a Gaussian hidden Markov model for can be built for continuous semantic coordinates or discrete hidden Markov models can be built for semantic clusters). Alternatively, a probability matrix of each semantic cluster for each hour of the week can be built.

A similarity matrix is calculated at step 245 between all pairs of individuals by calculating the probability product kernel or any kernel between probability distributions between the hidden Markov models and/or the hourly probability matrices. Using a similarity matrix various derived analyses can be performed and metrics determined using standard matrix tools, such as computing a network of individuals at step 246, performing semantic embedding of individuals at step 247, and performing semantic clustering of individuals at step 248. Such derived analyses can be performed to identify and characterize qualitatively and quantitatively similar data points between two time location data trails and the associated individual. It will be appreciated that a kernel matrix can be replaced for the similarity matrix. It will be appreciated that known distance, metric and kernel functions can be used to derive analyses from matrices formed by various time location data points and trails, including forming a network of data points, semantic embedding (using eigenvectors, Perron vectors, Locally Linear Embedding ("LLE") or Minimum Volume Embedding ("MVE") for example) and semantic clustering (using spectral clustering algorithms, for example). Such standard functions can be used to identify groups of individuals with respect to a particular time, place, time and place or event.

Groups of individuals, along with other derived similarity data relating to individuals associated with time-location data trails can be exported at step 290 for further analyses, display to a user, or stored in a data base for future use.

Figure 4:
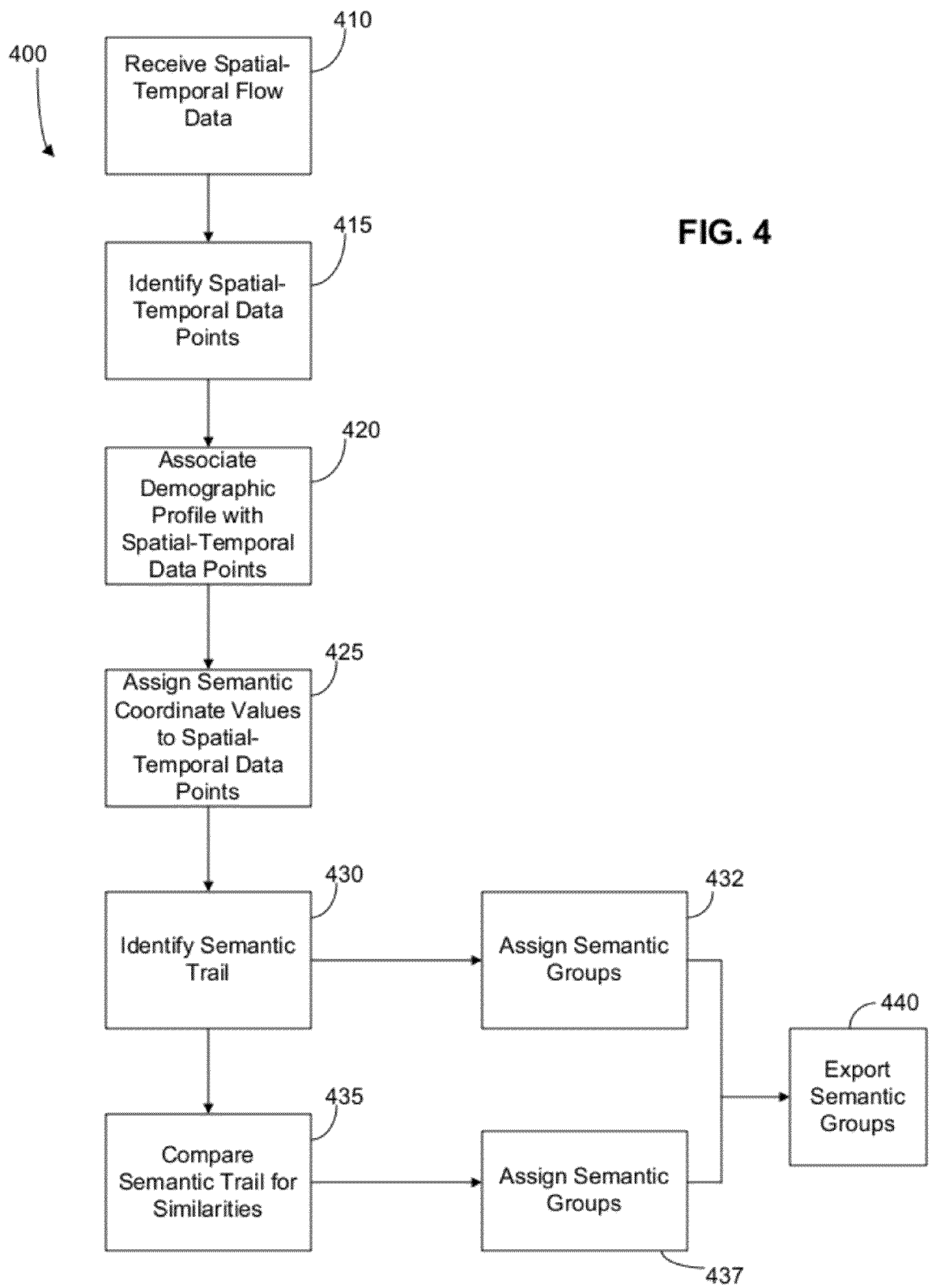
FIG. 4 shows a flow chart of an implementation of the present invention.

FIG. 4 depicts an exemplary implementation of a method 400 for comparing similarities between spatial-temporal trails and associating demographic information with such spatial temporal trails, the method comprising: receiving spatial-temporal flow data 410; identifying spatial temporal data points 415; associating demographic categories with one or more spatial-temporal data points in the data flow 420; assigning semantic coordinate values to the spatial-temporal data points 425 to build a semantic or demographic trail 430; assigning semantic group membership or association based on the semantic trail data 432; comparing the semantic trail with other semantic trails 435; assigning semantic group membership or association based on the similarity of semantic trails 437; and exporting the derived semantic group information 440 for further processing, display or storage.

Spatial-temporal data points form a spatial temporal trail or data flow. Such data flow is received at step 410, typically over a network by a server. Receipt of the spatial-temporal data flow at step 410 can be in real time, in batches, according to a predetermined schedule or pulled from member devices on as needed or on-demand basis.

Each spatial-temporal data point within the data flow is identified at step 415. For example the latitude-longitude, GPS coordinate or municipal grid coordinate is determined within the spatial temporal data flow.

Each spatial-temporal data point is then associated at step 420 with one or more demographic categories to build a profile specific to each spatial-temporal data point. Demographic categories for each location can be based on demographic data either stored in a database or available over a network. Demographic categories are assigned a semantic or demographic value. For example, a given location having an average income value under $100K can be assigned a semantic value of "A." Another location that has average incomes over $100K can be assigned a semantic value of "B." A location zoned for retail business can be assigned a semantic value of "X" and a location zoned for residential, single-family homes can be assigned a semantic value "Y." It will be appreciated that multiple demographic categories can be used. Examples of these categories include, but are not limited to:

i. standard Census Bureau data (e.g., income, home value, ethnicity, etc.),
ii. Standard Industrial Classification ("SIC") Codes, and
iii. time periods or time intervals (e.g., daytime hours, school hours, weekend flow, rush hours, shopping seasons, holiday seasons, etc.).

Using semantic values of demographic categories known to be associated with specific spatial-temporal coordinates, semantic coordinates can be assigned at step 425 to each spatial temporal coordinate. For example, an individual who travels from a middle class residential neighborhood to an upscale shopping mall can be represented as traveling from semantic coordinate "A,Y" to semantic coordinate "B,X."

A semantic trail is identified at step 430 by linking all semantic coordinates. The semantic trail can be associated with an individual. Semantic or demographic groups can be assigned at step 432 to a profile associated with the individual based on the semantic trail information. By associating the individual with the demographics of when and where the individual has been, an accurate and unbiased profile is built.

The semantic trail can also be compared at step 435 with other semantic trails of the same individual or other individuals. Comparison can be made with other trails in real time or against historical trails. A similarity matrix can be computed using comparisons of two or more semantic trails. Various derived analyses can be performed using standard matrix tools, such as computing a network of times, places and/or individuals associated with a data trail, performing semantic embedding of times, places and/or individuals associated with a data trail and performing semantic clustering of times, places and/or individuals associated with a data trail. Such derived analyses can be performed to identify and characterize qualitatively and quantitatively similar data points between two time location data trails, similar trail segments or multiple data points within two trails, complete-time location data trails or individuals associated with data trails. It will be appreciated that a kernel matrix can be replaced for the similarity matrix. It will be appreciated that known distance, metric and kernel functions can be used derive analyses from matrices formed by various time location data points and trails, including forming a network of data points, semantic embedding (using eigenvectors, Perron vectors, Locally Linear Embedding ("LLE") or Minimum Volume Embedding ("MVE") for example) and semantic clustering (using spectral clustering algorithms, for example).

The similarity matrix can be used to identify likely demographic affiliations with the data trail or individual associated with the data flow. Other recommendations and derivations can made from the similarity matrix including finding individuals most similar to a specific individual or group of individuals, determining likelihood or probability of participation in an event, such as a promotional program or favorable response to a particular piece of content.

Having identified the semantic trail at step 430 and compared the trail for similarities to other semantic trails at step 435, various semantic or demographic groups can be assigned to the individual profile. The individual profile along with semantic group information can be exported at step 440 for further processing, display or storage.

Figure 5:
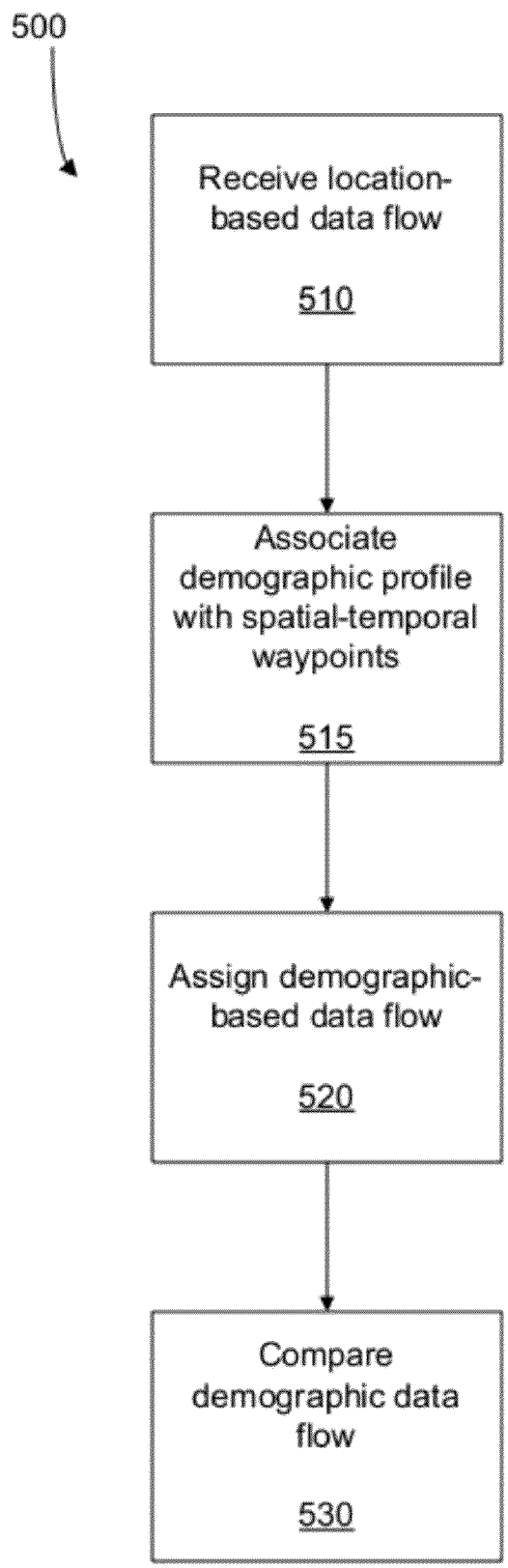
FIG. 5 shows a flow chart of an implementation of the present invention.

In another implementation depicted in FIG. 5, a method is provided for comparing spatial-temporal flow data comprising: receiving location-based data flow 510, such as a GPS trail; associating a demographic profile with the spatial-temporal waypoints making up the data trail 515, such as associating demographics with specific location coordinates in a GPS trail; deriving or assigning a demographics based data trail 520; and comparing the demographic based data trail with other trails to determine likely similarities and demographic affiliations 530.

Figure 6:
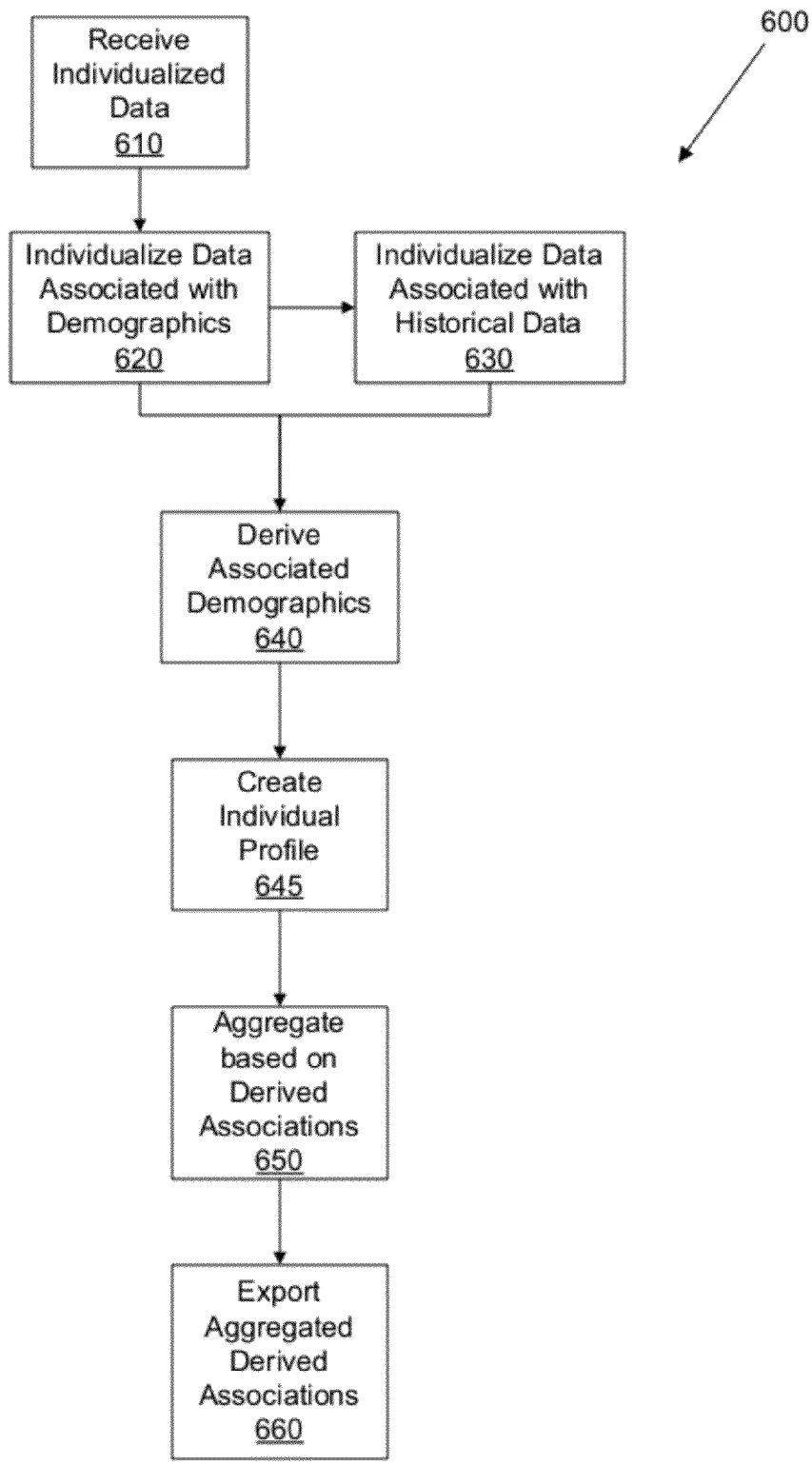
FIG. 6 shows a screen shot depicting associated data in accordance with an implementation of the present invention.

FIG. 6 depicts an alternative method 600 for associating information with a spatial-temporal data point to determine, for example group membership, including receiving spatial-temporal flow data 610; associating the spatial-temporal data points with demographic information 620 and associating the spatial-temporal flow data with a historical record of the individual 630; deriving source profiles, demographic profiles and/or demographic information associated with spatial-temporal data points 640; aggregating two or more individualized spatial-temporal data points having associated source or demographic profiles 650; and exporting the aggregated individualized spatial-temporal data points 660 for display, additional processing or storage.

In step 610, individualized spatial-temporal data is received, for example, at a location based service provider facility. As discussed above, spatial-temporal data point is data or other information that identifies a specific event, user, or device at a specific time and/or location.

Once the location and time of a unique source are received and identified, demographic information can be associated with the time, place or time and place for which the unique source is located. As such, demographic information and profiles are associated at step 620 with the individualized spatial-temporal data point. The demographic information can identify, for example the average income, age, and educational level of residents living in the neighborhood for which the unique identifier is located, as indicated by the individualized spatial-temporal data point. The demographic information can include, for example, the consumer trends and profiles associated with individuals who have previously been at the location during the time that the unique identifier also located, as indicated by the individualized spatial-temporal data point. As previously discussed, the demographic information that can be associated with the time and/or location can include a variety of information including: Census Bureau data, age, gender, religion, ethnicity, national or regional origin, education level, income level, employment, occupation, vocation, career, hobby, interest, marital status, sexual orientation, consumer preferences, consumer habits, organizational membership and participation, occurrence of an event, geographic location, time or time period, semantic group membership and/or association.

A historical record of the previous locations to which an individual has traveled can also be analyzed and associated at step 630 with the spatial-temporal data point. For example, based on previous locations that the individual has traveled, various demographic groups may already be attributed to the individual. Additionally, various demographic profiles associated with the previous locations may also be known. By way of example, an individual that spends four hours every afternoon in an exclusive shopping district can be associated with a number of demographic groups. But knowing that the same individual spent the previous four hours at a community college in a largely immigrant community adds additional information leading to a smaller set of likely demographic group associations.

After associating at step 620 demographic information relating to the current individualized spatial-temporal data point and associating historical information about the individual at step 630, inferences, profiles, and further informational association can be derived. Derivation at step 640 of the associated demographic profiles can include comparing spatial-temporal data points in a spatial-temporal trail with demographic information related to the location and time of the current position of the individual. Derivation at step 640 allows for further refinement of group associations and assignment of new group associations. Derived analytics can be obtained. Such analytics include, without limitation, a relative degree of association of the individual with a demographic group and or recommendations of places, topics, events or items of interest to a particular tribe.

Comparison of similarities between spatial-temporal data points and spatial-temporal data trails can be accomplished using similarity matrices. Various derived analyses can be performed and metrics determined using standard matrix tools, such as computing a network of times, places and individuals, performing semantic embedding of times, places and individuals and performing semantic clustering of times, places and individuals. Such derived analyses can be performed to identify and characterize qualitatively and quantitatively similar data points between two time location data trails and the associated individual. It will be appreciated that a kernel matrix can be replaced for the similarity matrix. It will be appreciated that known distance, metric and kernel functions can be used derive analyses from matrices formed by various time location data points and trails, including forming a network of data points, semantic embedding (using eigenvectors, Perron vectors, Locally Linear Embedding ("LLE") or Minimum Volume Embedding ("MVE") for example) and semantic clustering (using spectral clustering algorithms, for example). Such standard functions can be used to identify groups of individuals with respect to a particular time, place, time, place or event.

Derivation at step 640 allows for linking and storing at step 645 of demographic information of the individual, for example in an anonymous individual profile. Such information can be used for future use in historical association at step 630 as more spatial-temporal data points become available. The stored demographic information can be exported to other applications for further analysis.

Once demographic group associations of individuals are derived, a plurality of spatial-temporal data points and/or spatial-temporal trails of data points having demographic associations are aggregated at step 650 to determine the location of members of any particular demographic group. Analytics can be performed on the aggregated data, including:

i. population density of demographic groups within a given geographic location, such as the number of middle income individuals over 30 at a shopping mall;

ii. the number of group members within one or more designated areas at a designated time or time period, such as the number of women under 25 at specific retail locations during a sales event; and iii. the occurrence of an event for a group member in a specific location at a specific time, such as the number of a taxi cabs carrying passengers in the late afternoon in the financial district of a city.

Having aggregated a plurality of spatial-temporal data points and or trails with associated demographics and derived group associations, information about individuals and demographic groups can be recorded or stored for further processing or displayed at step 660 to a user. Display of the aggregated derived group information can be, for example, to a mobile device, a user terminal such as a personal computer, a networked system display such as an ATM, or a public display.

Figure 7:
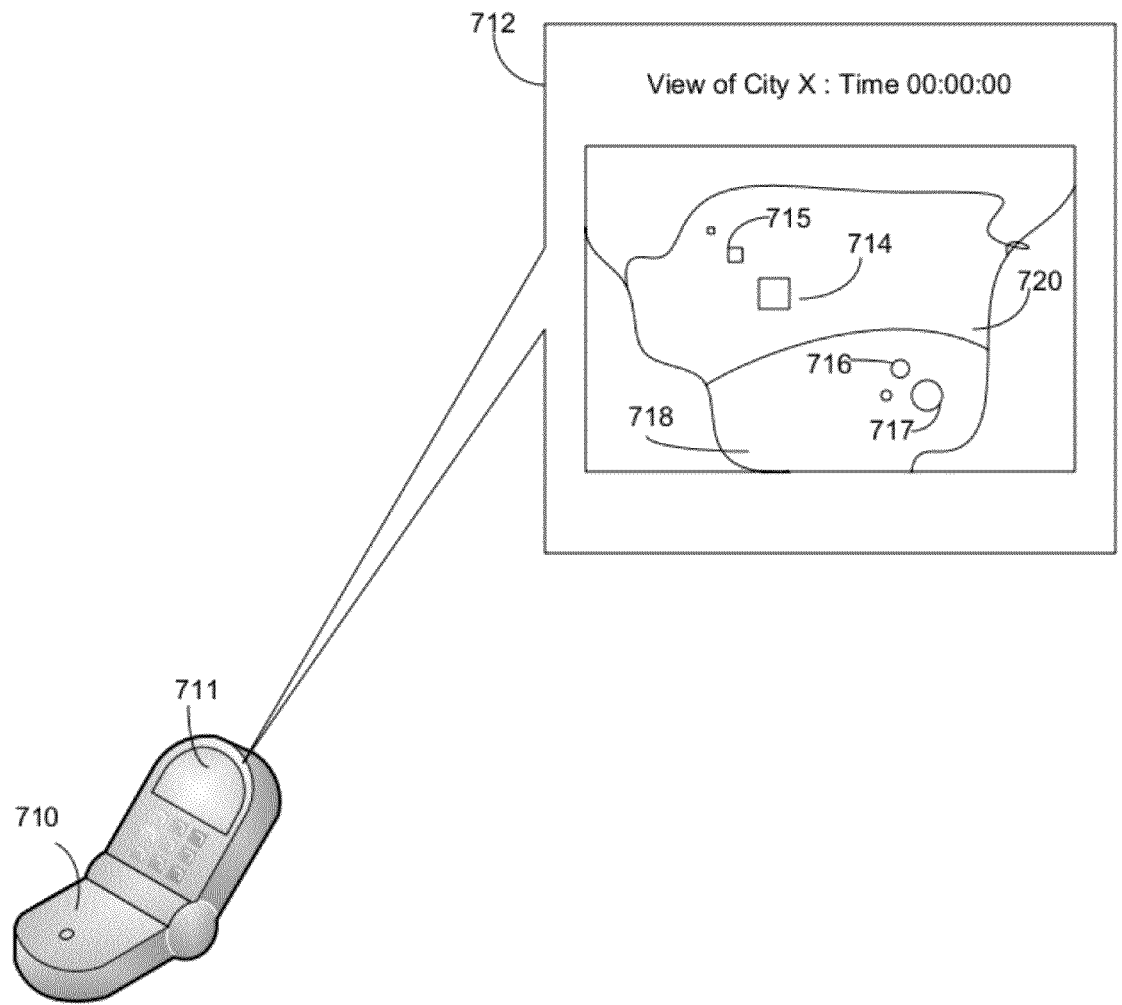
FIG. 7 shows a screen shot for managing associated data in accordance with the present invention.

In an exemplary implementation as shown in FIG. 7, the mobile device 710 includes display 711 having display view 712 showing the location of groups 714 and 716 at various locations in City X including neighborhood 718 and 720. Relying on analytics performed on the aggregated spatial-temporal data points or trails, as described above, population density for a particular group is shown by varying the size of the group icon 714. For example, group icon 715 is similar to but smaller than group icon 714, thereby indicating fewer group members at the location indicated by group icon 715. Likewise, group icon 717 is similar to but larger than group icon 716, thereby indicating more group members at the location indicated by group icon 717. The relative population density of a group can be indicated by any manner of display means including variations in icon size, shape, color, intensity, and the like.

In addition to population density, clusters of demographic groups can be identified in a similar manner. Detection of group clusters and anomalous occurrences within a spatial-temporal trail are described in co-pending U.S. patent application Ser. No. 12/241,266, filed Sep. 30, 2008, the contents of which are incorporated herein by reference in their entirety.

Figure 8:
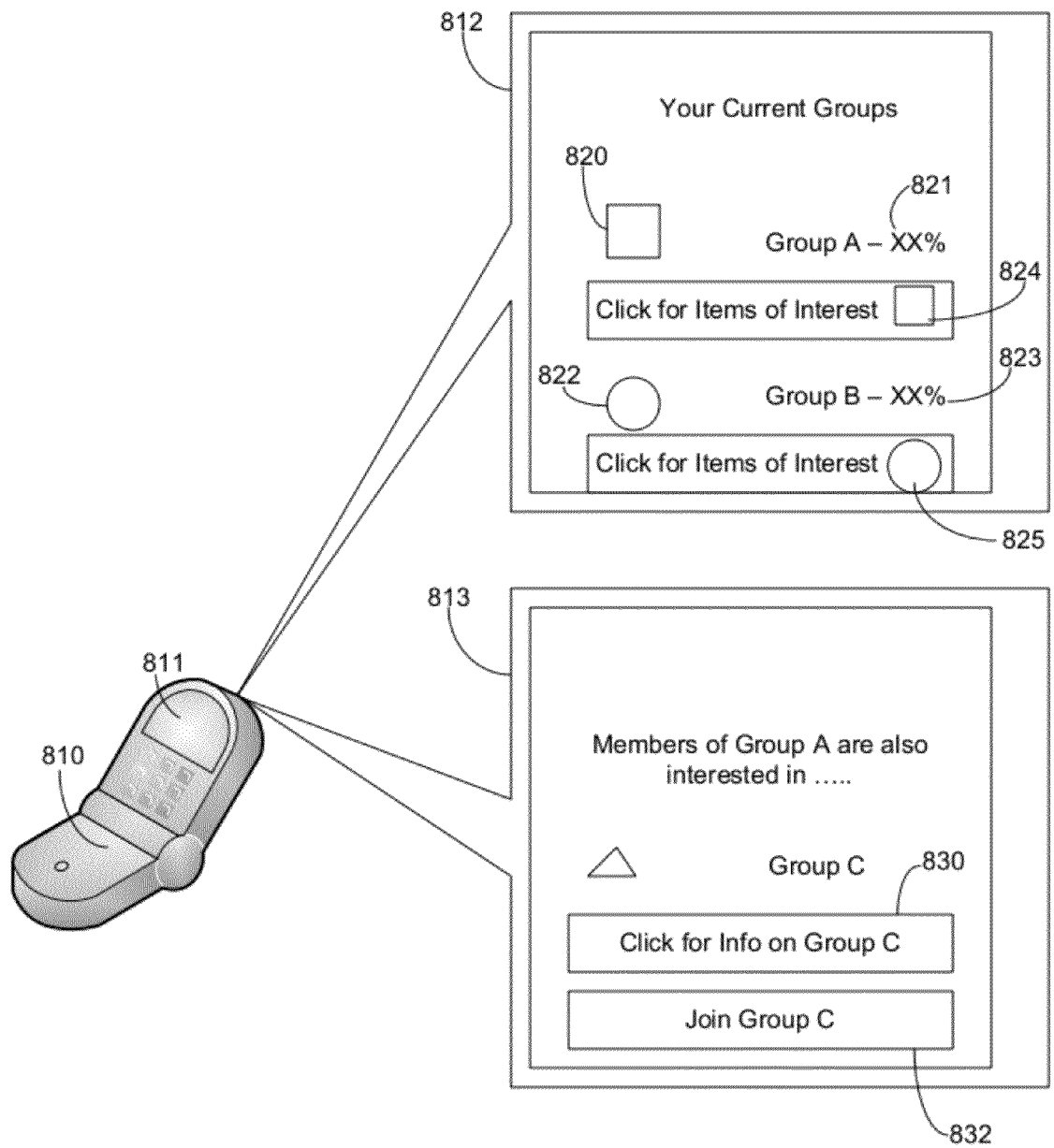
FIG. 8 shows a screen shot for managing associated data in accordance with the present invention.

In an exemplary implantation as shown in FIG. 8 a user interface is provided on a mobile device 810 having a display 811. View 812 of display 811 shows demographic group associations to which the user belongs. View 812 displays to the user two group associations 820 and 822 along with certain derived information, such as, for example, the percentage of association of the user with Group A indicated by percentage display 821 and 823. The user can access additional derived information through user prompt 824 and 825, such as, for example, obtaining information about items of interest to a particular group. View 813 depicts additional derived information available to the user, such as for example, recommended items of interest for a particular group. The recommended items of interest can include retail locations, services, organizations, places of interest, events and the like. By way of example, view 813 shows that members of Group A are also interested in Group C. The user can be prompted to obtain more information about the recommended item of interest, as in prompt 830 or to participate in the item of interest, as in prompt 832. Recommendations can be provided based on probability of a favorable response or participation in an event, as discussed above.

Figure 9:
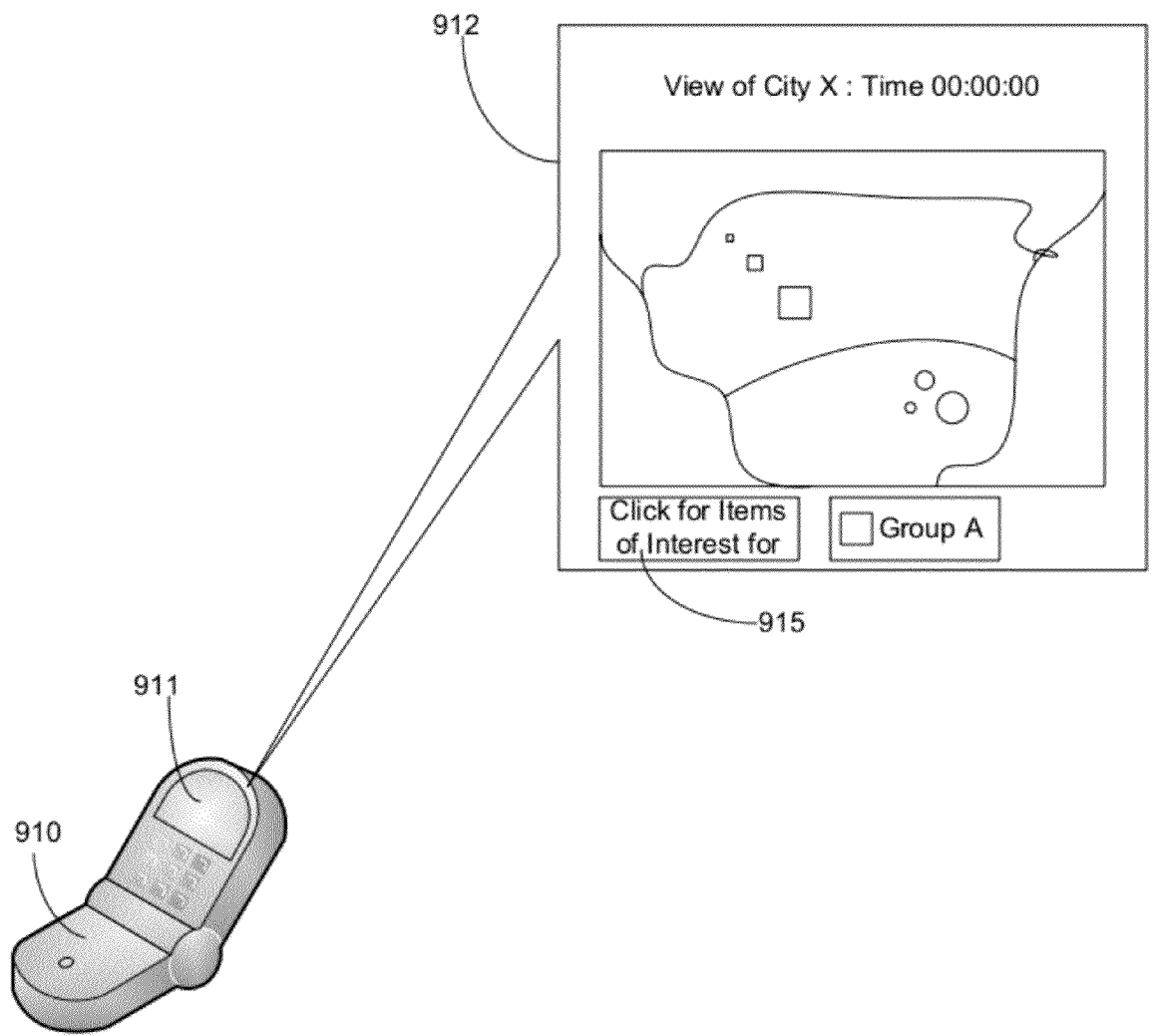
FIG. 9 shows a screen shot depicting associated data in accordance with the present invention.
Figure 10:
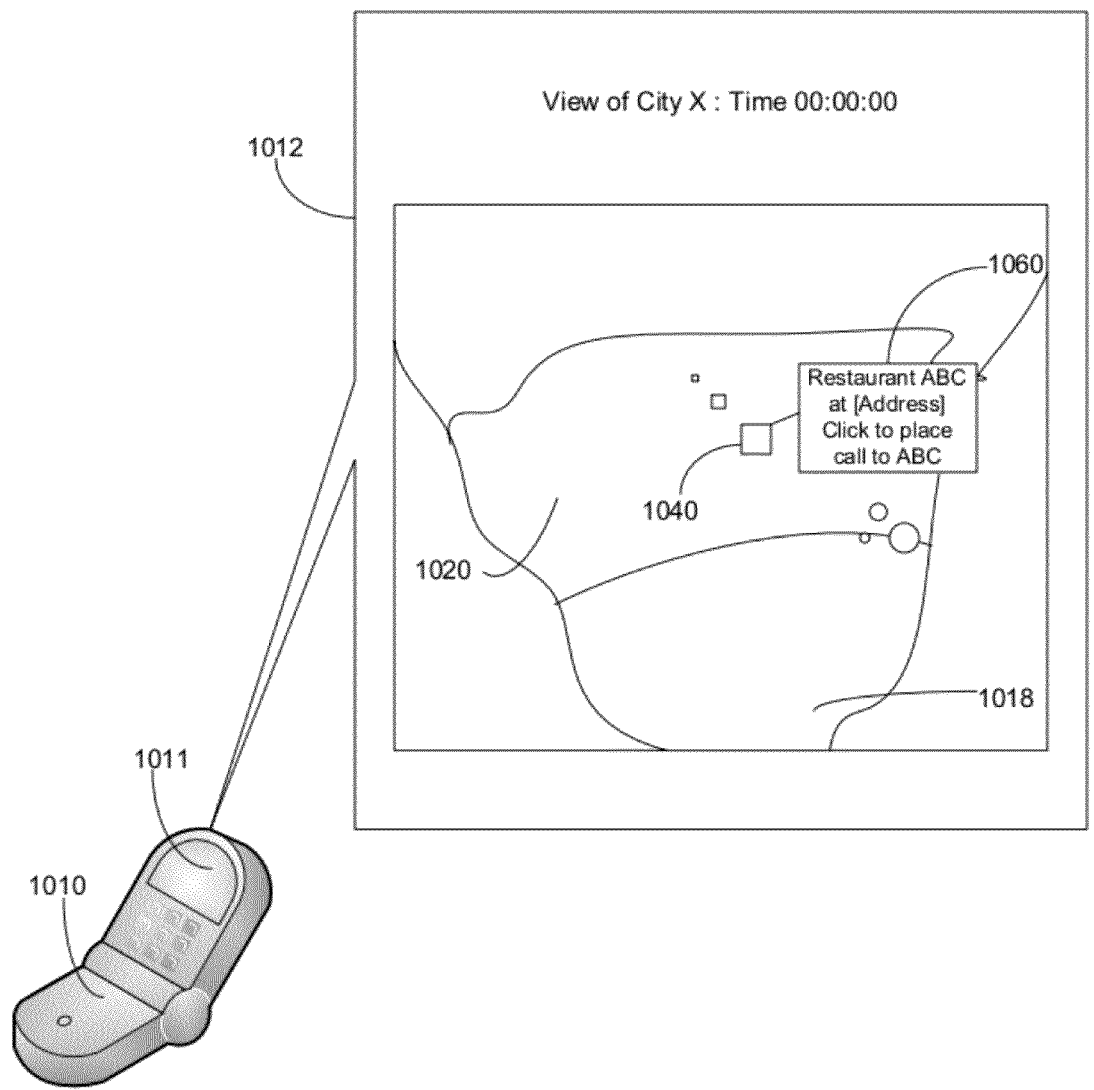
FIG. 10 shows a screen shot for managing associated data in accordance with the present invention.

FIG. 9 depicts another exemplary implementation of a user interface for gaining access to derived information associated with a group. For example, the user can be prompted to obtain items of interest to group A through user prompt 915. FIG. 9 depicts mobile device 910 having a display 911 that displays view 912. FIG. 10 depicts an exemplary implementation of view 1012 of mobile device 1010 having display 1011. View 1012 of display 1011 shows neighborhoods 1018 and 1020, and an item of interest at a location 1040 having a relatively high population density of members of Group A. Call out 1060 can be an interactive window or other user prompt allowing connectivity via the internet, telephone line, email, text message or other media to the item of interest at the location 1040.

Figure 11:
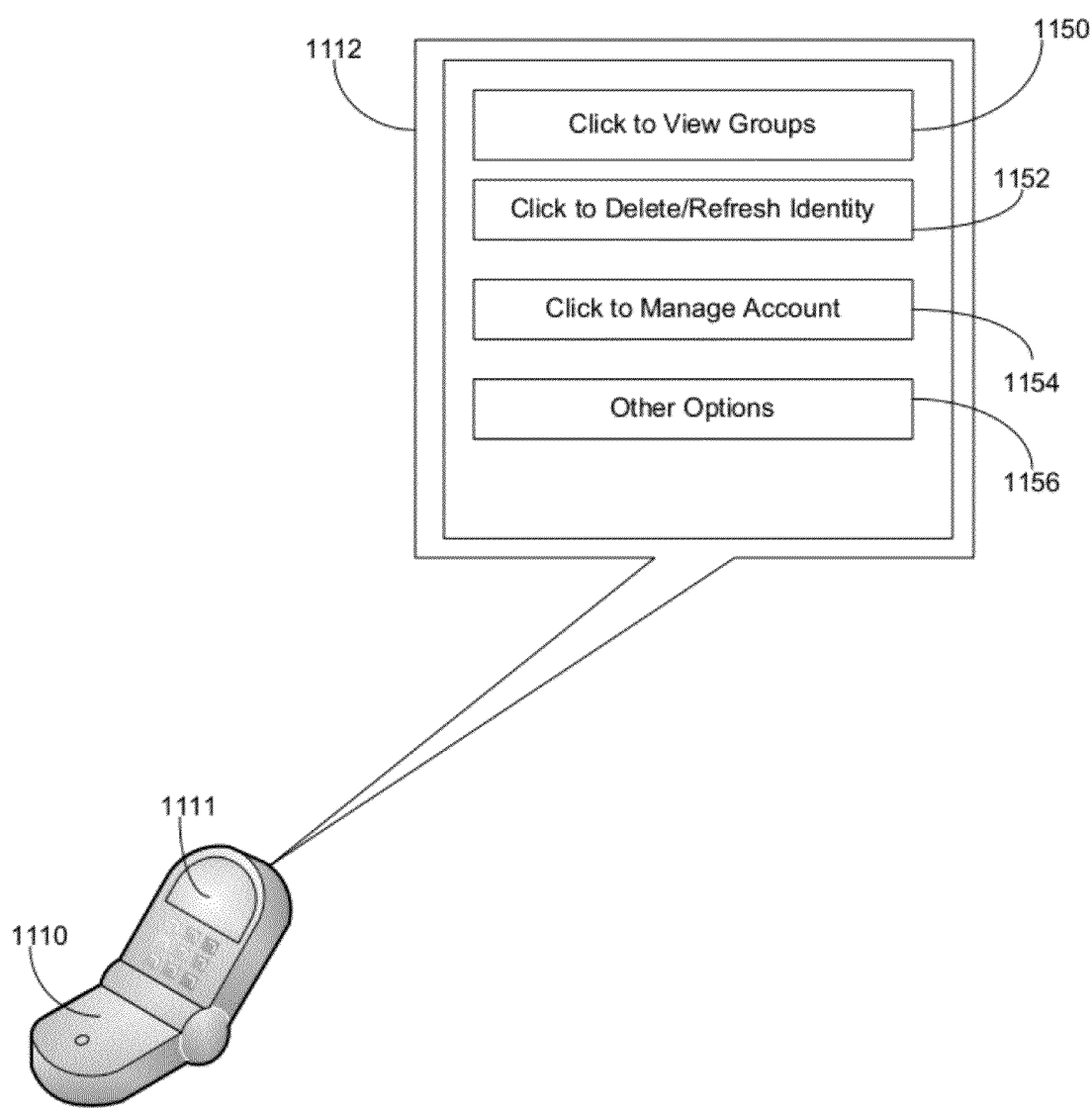
FIG. 11 shows a screen shot depicting associated data in accordance with the present invention.

FIG. 11 depicts an exemplary user interface for managing an individual profile and associated demographic and historical information, and features mobile device 1110 having display 1111. View 1112 of display 1110 shows user prompts 950 for viewing demographic groups to which the user may be assigned, user prompt 1152 for refreshing or deleting the source profile, account management prompt 1154 and other miscellaneous prompts 1156.

Figure 12:
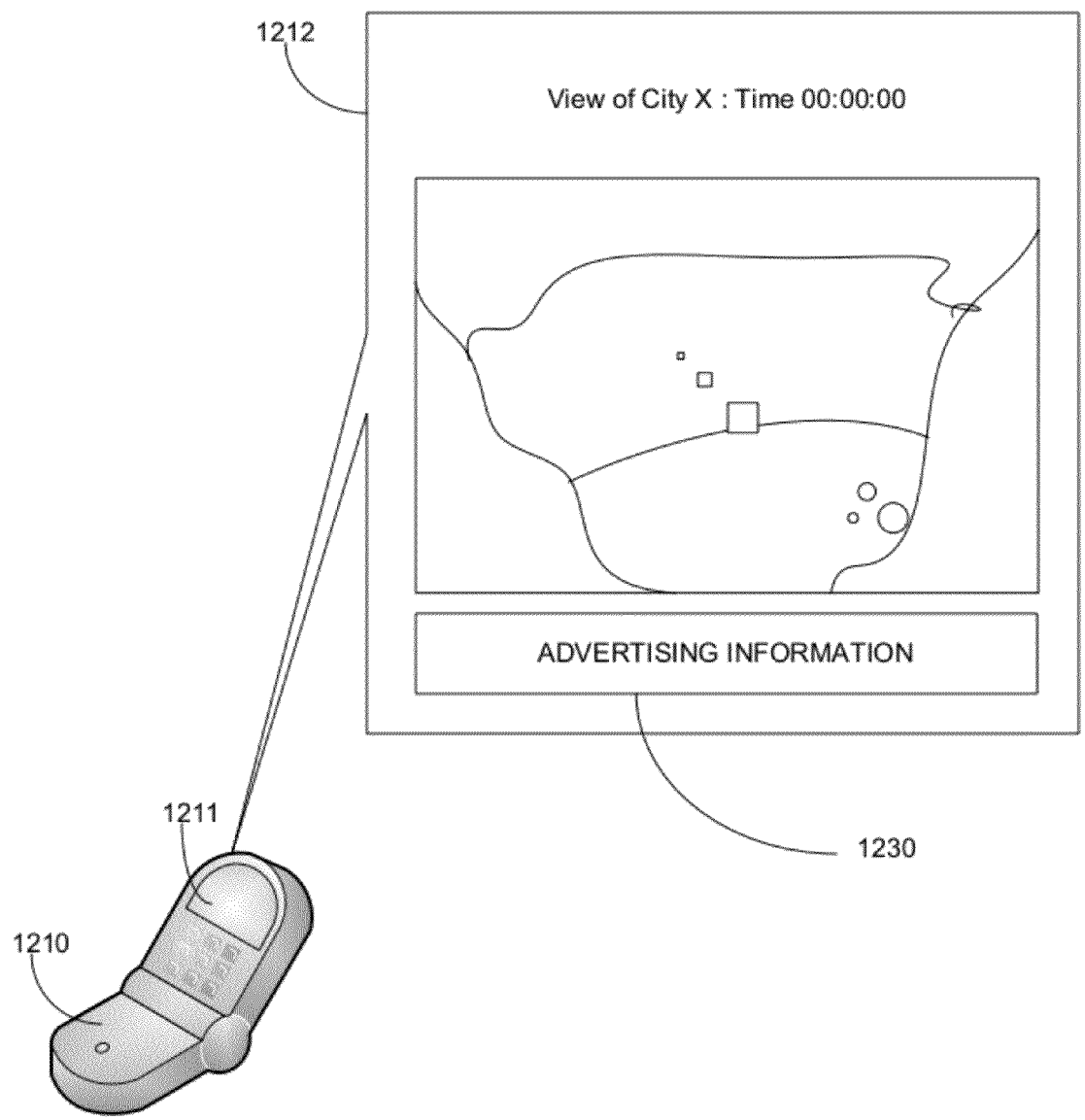
FIG. 12 shows a screen shot depicting associated data in accordance with the present invention.

FIG. 12 depicts an exemplary user display 1211 of mobile device 1210. Display 1211 includes view 1212 showing advertising information 1230 displayed in a window or banner. Advertising information 1230 can include any information likely to be of interest to a demographic group to which the user belongs or targeted to the user based on demographic group affiliation, information in the individual profile including associated demographic and historical information, geographic location of the individual, and the like.

Although interactive windows have been shown to indicate user interface options, other means of data selection and input are available including touch screen, keyboard, voice recognition, or physical manipulation of the device. In an exemplary implementation, the location of tribal members can be displayed on the user display of a mobile device at any time by deliberately shaking the device in a repeated manner. An accelerometer embedded within the mobile device sense the shaking of the device and instructs the device to display the current location of the tribal members.

In other implementations, functionality of the user device, such as a mobile telephone can be linked to derived information available to the user. For example, the alarm function of the mobile telephone can be triggered should the population density of a tribe at a particular location reach a predetermined number. An example can include an alarm trigger if the number of vehicles passing over a bridge or toll booth exceed X number per minute.

Figure 13:
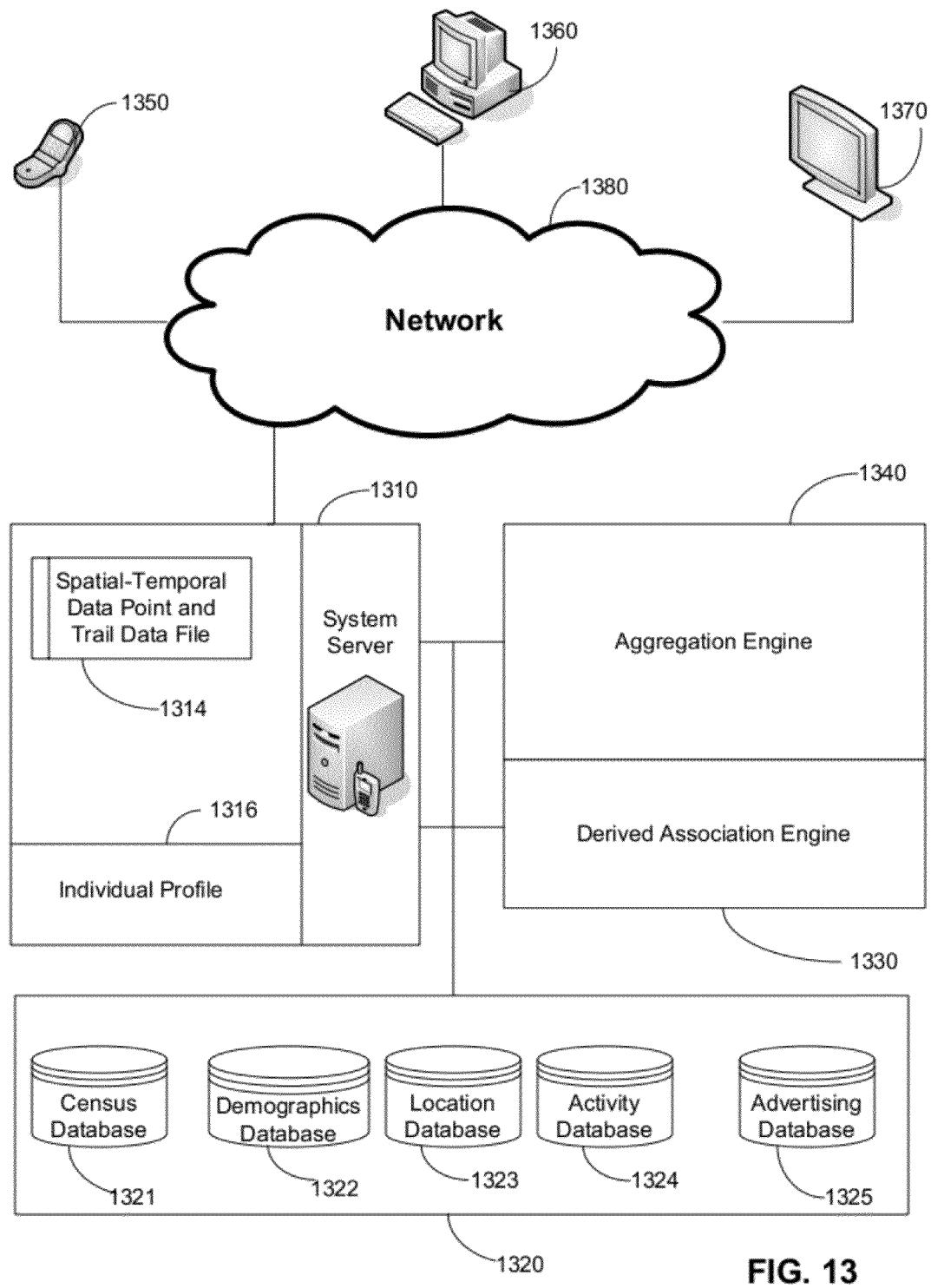
FIG. 13 shows a system diagram of an implementation of the present invention.

FIG. 13 depicts a system diagram of an exemplary implementation. System 1300 includes system server 1310. System server 1310 can include a processor coupled to a computer readable memory. System server is in communication with spatial-temporal data point historical file 1314 and individual profile 1316. Historical file 1314 and individual profile 1316 can be stored on system server 1310 or on a secondary storage device (not shown). System server 1310 is also in communication with database bank 1320. Database bank 1320 can include one or more data bases or access to databases including Census Database 1321, demographic information database 1322, location database 1323, activity database 1324, and advertising database 1325. Other databases can be used. System server 1310 and database bank 1320 are in communication with derived association engine 1330 and aggregation engine 1340. System server 1310 is also in communication with user device 1350, user terminal 1360 and public display 1370 via network 1380. Network 1380 can be the Internet.

In operation, system server 1310 receives a spatial-temporal data point or trail from either user device 1350 or user terminal 1360. The system server 1310 is configured to associate the spatial-temporal data point or trail with an individual profile 1316 and a historical file 1314. Derived association engine 1340 is configured to match demographic information retrieved from database bank 1320 with the spatial-temporal data point or trail and associated historical information and assign one or more demographic groups to the individual associated with the spatial-temporal data point or trail. Demographic groups can be assigned using similarity comparisons as described above. The demographic group association is recorded or stored and the historical data file 1314 and individual profile 1316 are updated.

Aggregation engine 1340 is configured to compile spatial-temporal data points and/or trails and individuals with their associated demographic information and demographic group affiliations. Aggregation engine 1340 is further configured to determine additional derived data relating to the number and frequency of various flow patterns to and from a spatial-temporal data point, or associated with a demographic group. Additional derived data can be determined using similarity comparisons as described above. Aggregation engine 1340 provides the aggregated location of all individuals within a group along with the additional derived data to system server 1310. System server 1310 then exports the aggregated and derived data to user device 1350, user terminal 1360 or public display 1370. The aggregate data can be exported in a data feed for further processing, or displayed on a user display or public display in graphical or tabulated form.

Embodiments of the subject matter described in this specification can be implemented in a computing system that includes a back end component, e.g., as a data server, or that includes a middleware component, e.g. any distributed, parallel or cloud computing infrastructure, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments and implementations of the invention have been described. Other embodiments are within the scope of the following claims. For example, the actions recited in the claims can be performed in a different order and still achieve desirable results.

The foregoing description is intended to illustrate various aspects of the present invention. It is not intended that the examples presented herein limit the scope of the present invention. The invention now being fully described, it will be apparent to one of ordinary skill in the art that many changes and modifications can be made thereto without departing from the spirit or scope of the appended claims.

What is claimed is:

1. A computer implemented method comprising:
   receiving spatial-temporal flow data associated with a first individual, the spatial-temporal flow data comprising spatial-temporal data points;
   replacing the spatial-temporal data points with semantic coordinate values, resulting in a first semantic trail being created, wherein the semantic coordinate values identify one or more demographic characteristics; and
   determining a similarity of the first semantic trail with a second semantic trail.

2. The computer implemented method of claim 1 wherein the spatial-temporal flow data comprises geographic coordinates associated with the first individual.

3. The computer implemented method of claim 1 wherein the spatial-temporal flow data comprises grid coordinates associated with the first individual.

4. The computer implemented method of claim 1 wherein the spatial-temporal flow data comprises GPS coordinates associated with the first individual.

5. The computer implemented method of claim 1 wherein the spatial-temporal flow data comprises time increments associated with the first individual.

6. The computer implemented method of claim 1 wherein the first individual comprises a person, a Global Positioning System (GPS) enabled device, a location enabled device, a radio-frequency identification (RFID) enabled device, a cellular telephone, a personal data assistant, a networked computer, a communication device, or a vehicle.

7. The computer implemented method of claim 1 wherein the first individual is anonymously identified by use of a GPS enabled device, a location enabled device, an RFID enabled device, a cellular telephone, a personal data assistant, a networked computer, a communication device, or a vehicle.

8. The computer implemented method of claim 1 wherein the spatial-temporal flow data comprises data indicating the time and place of a location of the first individual.

9. The computer implemented method of claim 8 wherein the location is a past location.

10. The computer implemented method of claim 1 wherein the spatial-temporal flow data is received in real time.

11. The computer implemented method of claim 1 wherein the spatial-temporal flow data comprises historical data.

12. The computer implemented method of claim 1 wherein the one or more demographic characteristics comprise Census Bureau data, financial demographics, social demographics, marketing data, group demographics, organizational affiliation, social affiliation, sales data, historical demographical information, derived demographic information, gender, race, age, religion, ethnic affiliation, sexual preference, marital status, dependent status, educational level, historical geographic information, or user entered information/preferences.

13. The computer implemented method of claim 1 wherein the first semantic trail characterizes the first individual based on semantic data points comprising demographic information.

14. The computer implemented method of claim 1 wherein the similarity of the first semantic trail is determined using a similarity matrix.

15. The computer implemented method of claim 1 wherein the second semantic trail is a historical semantic trail.

16. The computer implemented method of claim 1 wherein the first and second semantic trails are associated with the same individual.

17. The computer implemented method of claim 1 wherein the first and second semantic trails are associated with different individuals.

18. The computer implemented method of claim 1 wherein the first semantic trail is compared with a plurality of second semantic trails.

19. The computer implemented method of claim 18 wherein the plurality of second semantic trails are associated with one or more individuals different than the individual associated with the first semantic trail.

20. The computer implemented method of claim 1 further comprising creating a time series of semantic coordinates to establish the first semantic trail.

21. The computer implemented method of claim 20 wherein the time series of semantic coordinates is determined using a hidden Markov model.

22. The computer implemented method of claim 1 further comprising:
   determining a similarity of multiple first semantic trails associated with multiple different individuals with multiple second semantic trails associated with the multiple different individuals, including the first individual; and
   determining a similarity matrix between all semantic trails associated with all individuals, including the first individual.

23. A computer implemented method comprising:
   receiving a location-based data flow associated with a first individual, wherein the location-based data flow comprises spatial-temporal waypoints;
   associating a demographic profile with the spatial-temporal waypoints;
   assigning a first demographic-based data flow to the first individual, the first demographic-based data flow being based on the demographic profile; and
   comparing the first demographic-based data flow assigned to the first individual to a second demographic-based data flow assigned to a second individual.

24. The computer implemented method of claim 23 wherein the first individual comprises a person, a GPS enabled device, a location enabled device, an RFID enabled device, a cellular telephone, a personal data assistant, a networked computer, a communication device, or a vehicle.

25. The computer implemented method of claim 23 wherein the location-based data flow is received in real time.

26. The computer implemented method of claim 23 wherein the location-based data flow comprises historical data.

27. The computer implemented method of claim 23 wherein the spatial-temporal waypoints comprise a latitude-longitude coordinate, a grid coordinate, a GPS coordinate, an address, a network cell, a time period, or a specific time.

28. The computer implemented method of claim 23 wherein the demographic profile comprises Census Bureau data, financial demographics, social demographics, marketing data, group demographics, organizational affiliation, social affiliation, sales data, historical demographical information, derived demographic information, gender, race, age, religion, ethnic affiliation, sexual preference, marital status, dependent status, educational level, historical geographic information, or user entered information/preferences.

29. The computer implemented method of claim 23 wherein an individual demographic profile is associated with each of the spatial-temporal waypoints.

30. The computer implemented method of claim 23 wherein the comparing of demographic-based data flows comprises comparing similarity matrices of all demographic-based data flows assigned to individuals.

31. A computer implemented method comprising:
receiving spatial-temporal data trails comprising spatial-temporal data points that identify places, wherein each of the places is identified by a corresponding spatial-temporal data point, and wherein each of the spatial-temporal data trails is associated with an individual; and
determining a similarity matrix between pairs of the places, to establish one or more groups of places or one or more groups of individuals.

32. The computer implemented method of claim 31 further comprising determining a similarity matrix between pairs of individuals, to establish one or more groups of places or one or more groups of individuals.

33. The computer implemented method of claim 31 wherein the spatial-temporal data trails comprise geographic coordinates associated with one or more individuals.

34. The computer implemented method of claim 31 wherein the spatial-temporal data trails comprise grid coordinates associated with one or more individuals.

35. The computer implemented method of claim 31 wherein the spatial-temporal data trails comprise GPS coordinates associated with one or more individuals.

36. The computer implemented method of claim 31 wherein the spatial-temporal data trails comprise time increments associated with one or more individuals.

37. The computer implemented method of claim 31 wherein the individual comprises a person, a GPS enabled device, a location enabled device, an RFID enabled device, a cellular telephone, a personal data assistant, a networked computer, a communication device, or a vehicle.

38. The computer implemented method of claim 31 wherein the individual is anonymously identified by use of a GPS enabled device, a location enabled device, an RFID enabled device, a cellular telephone, a personal data assistant, a networked computer, a communication device, or a vehicle.

39. The computer implemented method of claim 31 further comprising assigning a semantic coordinate to a spatial-temporal data point, resulting in a semantic data point.

40. The computer implemented method of claim 39 further comprising associating demographic information with the spatial-temporal data point or the semantic data point.

41. The computer implemented method of claim 39 further comprising associating an industrial code with the spatial-temporal data point or the semantic data point.

42. The computer implemented method of claim 39 further comprising associating an in-flow and out-flow data with the spatial-temporal data point or the semantic data point.

43. The computer implemented method of claim 39 further comprising determining the probability of movement of the individual in semantic space.

44. The computer implemented method of claim 31 further comprising exporting established groups of individuals.

45. A non-transitory computer readable medium having stored thereon a computer program that, when executed, causes a computer to perform the steps of:
receiving spatial-temporal data trails comprising spatial-temporal data points that identify places, wherein each of the places is identified by a corresponding spatial-temporal data point and wherein each of the spatial-temporal data trails is associated with an individual; and
determining a similarity matrix between pairs of the places, to establish one or more groups of places or one or more groups of individuals.

46. The non-transitory computer readable medium of claim 45 wherein the computer program, when executed, causes the computer also to perform the step of determining a similarity matrix between pairs of individuals to establish one or more groups of places or one or more groups of individuals.

47. A system comprising:
a network;
one or more user devices in communication with the network; and
a processor in communication with the network, wherein the processor is for:
receiving spatial-temporal data trails comprising spatial-temporal data points that identify places, wherein each of the places is identified by a corresponding spatial-temporal data point and wherein each of the spatial-temporal data trails is associated with an individual; and
determining a similarity matrix between pairs of the places, to establish one or more groups of places or one or more groups of individuals.

48. The system of claim 47 wherein the processor is also for determining a similarity matrix between pairs of individuals to establish one or more groups of places or one or more groups of individuals.

49. A system comprising:
means for receiving spatial-temporal data trails comprising spatial-temporal data points that identify places, wherein each of the places is identified by a corresponding spatial-temporal data point and wherein each of the spatial-temporal data trails is associated with an individual;
means for assigning a semantic coordinate to a spatial-temporal data point, resulting in a semantic data point;
means for determining a similarity matrix between pairs of the places, to establish one or more groups of places or one or more groups of individuals; and
means for determining a similarity matrix between pairs of individuals from their corresponding spatial-temporal data trails, to establish one or more groups of individuals.

* * * * *